United States Patent [19]

Grant

[11] 4,431,125

[45] Feb. 14, 1984

[54] TAPE ADVANCING METHOD AND APPARATUS WITH FAST TAPE ADVANCE MODE

[75] Inventor: Frederic F. Grant, Bellflower, Calif.

[73] Assignee: Bell & Howell Company, Chicago, Ill.

[21] Appl. No.: 369,854

[22] Filed: Apr. 19, 1982

Related U.S. Application Data

[63] Continuation-in-part of Ser. No. 171,851, Jul. 24, 1980, abandoned.

[51] Int. Cl.³ .............................................. B65H 17/32
[52] U.S. Cl. ...................................................... 226/97
[58] Field of Search .............................. 226/3, 95, 97; 242/182–185; 360/71, 72, 102, 103

[56] References Cited

U.S. PATENT DOCUMENTS

| | | | |
|---|---|---|---|
| 3,254,854 | 6/1966 | Deighton et al. | 226/97 |
| 3,612,539 | 10/1971 | Bragas | 226/91 |
| 3,645,471 | 2/1972 | Kjos | 242/182 |
| 3,779,481 | 12/1973 | Wilson | 242/182 |
| 3,826,446 | 7/1974 | Jones | 242/185 |
| 3,863,863 | 2/1975 | Ende | 242/181 |
| 3,892,007 | 7/1975 | Pembroke | 242/182 |
| 3,916,441 | 10/1975 | Jones | 360/90 |
| 3,986,651 | 10/1976 | Grant | 226/95 |
| 4,065,044 | 12/1977 | Painter et al. | 226/188 |
| 4,194,661 | 3/1980 | Grant | 226/95 |
| 4,316,568 | 2/1982 | Grant et al. | 226/118 |

*Primary Examiner*—Leonard D. Christian
*Attorney, Agent, or Firm*—Benoit Law Corporation

[57] ABSTRACT

Methods and apparatus for advancing tape relative to an information transducing head with the aid of a tape drive capstan employ a first vacuum column at the tape drive capstan and a second vacuum column remote from the capstan. The tape is applied to the capstan and to the vacuum columns and is advanced with the capstan through the vacuum columns and in information transducing relationship with the head in an information transducing mode. The tape is removed from the first vacuum column and is disengaged from the capstan for a fast tape advance mode, while being retained in the second vacuum column. The tape is advanced in the fast tape advance mode only through the second column, and the fast tape advance mode is controlled with the second vacuum column.

12 Claims, 3 Drawing Figures

TAPE ADVANCING METHOD AND APPARATUS WITH FAST TAPE ADVANCE MODE

CROSS-REFERENCE

This is a continuation in part of Patent Application Ser. No. 06/171,851, filed July 24, 1980 by Frederic F. Grant, for Tape Advancing Methods and Apparatus with Fast Tape Advance Mode, allowed Feb. 12, 1982, assigned to the subject assignee and now abandoned.

Part of the subject matter herein disclosed is disclosed and claimed in my copending Patent Application Ser. No. 06/369,853, filed of even date herewith, for Tape Advancing Methods and Apparatus With Fast Tape Advance.

BACKGROUND OF THE INVENTION

1. Field of the Invention

The subject invention relates to methods and apparatus for winding and unwinding webs of material or tapes and to tape or web transports and, for instance, has utility in magnetic tape transports and recording equipment, photographic film handling apparatus, cameras and projectors, and other tape or web transporting or handling equipment, particularly systems having different advance modes for tape, film or other web-like material, herein sometimes generically referred to simply as "tape."

2. Disclosure Statement

This disclosure statement is made pursuant to the duty of disclosure imposed by law and formulated in 37 CFR 1.56(a). No representation is hereby made that information thus disclosed in fact constitutes prior art.

In tape advancing methods and apparatus, tape is frequently advanced in engagement with one or more devices for acting on the tape. By way of example, in magnetic recording and playback systems, tape is typically advanced with an information recording surface in engagement with an information transducing head, such as a recording and playback head or head stack. In such instances, it is frequently desirable, for the purpose of time preservation or otherwise, that the particular recording and playback system has fast forward and rapid rewind facility, as far as the advancement of the tape between, preparatory to and after information recording and playback operations is concerned.

In general, it would be desirable in terms of head and tape life, attainable tape speed and other factors, that the tape be out of engagement with any transducing head during fast tape advance and rapid rewind operations. Many existing systems employ movable transducing heads to this end; moving the head or heads out of engagement with the tape between recording and playback operations. In practice, this frequently has the disadvantage of requiring special head carrying and moving devices or systems which, in high quality applications and equipment, tend to be rather expensive and demanding in terms of requisite precision and which are often not feasible.

Another proposal employs fluid pressure for applying a force on the tape at a position between a transducer assembly and capstan which forces the tape away from the capstan towards the transducer assembly, as may be seen from U.S. Pat. No. 3,688,956 by Magne J. Kjos, issued Sept. 5, 1972. U.S. Pat. No. 3,645,471, by the latter inventor, issued Feb, 29, 1972, discloses apparatus for guiding tape between two planes.

In terms of general applicability, an apparent drawback of that proposal is that it has to rely on the consistent maintenance of a positive fluid pressure gradient for a reliable application of the tape to the information transducing head and that it, moreover, inevitably calls for a partial separation of the tape from the driving capstan during the recording and playback process. On the other hand, it appears that the tape would remain in contact with a large and bulky capstan during attempted tape forward and rewind operations, thereby impeding attainable rapid tape speed.

Reference may in this respect also be had to my prior U.S. Pat. No. 3,986,651, issued Oct. 19, 1976 and showing concave vacuum tape guides along which tape was slid during recording and playback operations. That prior system inherently lacked a real tape fast forward and rapid rewind facility; inherently restricting tape advance and rewind to only about three times tape velocity during recording and playback. Also in that prior proposal, the tape remained applied to air bearing tape guides during the entire operation of the tape transport, and retractable heads would be necessary if disengagement of the tape from recording and playback heads were desired.

U.S. Pat. No. 4,065,044, by Alan Painter et al, issued Dec. 27, 1977, proposed a reversal of a vacuum capstan to an air supply system for achieving a separation of a tape from its capstan. This at least required the provision of a rather complicated capstan structure.

Similar considerations apply to proposals which circumvent the tape drive capstan during a tape threading operation, as may be seen from U.S. Pat. No. 3,645,472, by Audeh, 3,823,895, 3,826,446 and 3,916,411, by Jones, 3,863,863, by Ende and 3,892,007 by Pembroke.

Various other proposals engage the tape for the purpose of moving it into and out of engagement with recording and playback heads. Such proposals generally have the disadvantage of requiring recurring contact of the tape recording surface or layer with mechanical tape moving means, or of requiring movement of the tape in engagement with finger or rod-like tape moving elements, frequently about a relatively small radius, as may, for instance, be seen from U.S. Pat. No. 3,612,539, by Peter Bragas, issued Oct. 12, 1971.

U.S. Pat. No. 3,779,481, by H. Wilson, issued Dec. 18, 1973, discloses a vacuum buffer in which tape is lifted off transducing heads by atmospheric pressure. U.S. Pat. No. 3,254,854, by W. W. Deighton et al, issued June 7, 1966, discloses tape handling apparatus in which tape is kept in engagement with a guide block, even in an information transducing mode.

SUMMARY OF THE INVENTION

It is a general object of this invention to overcome the disadvantages and satisfy the needs expressed or implicit in the above disclosure statement or in other parts hereof.

It is a germane object of this invention to provide improved methods and apparatus for advancing tape in different tape advance modes.

It is a related object of this invention to provide improved control over the tape in fast tape advance modes particularly in systems which have also slower tape advance modes.

It is also an object of this invention to provide improved tape transport systems.

It is a further object of this invention to provide improved tape recording methods and apparatus.

Other objects of the invention will become apparent in the further course of this disclosure.

From a first aspect thereof, the subject invention resides in methods and apparatus for advancing tape having an information recording surface in an information transducing mode with the aid of a tape drive capstan, a first vacuum column at said tape drive capstan and a second vacuum column remote from said capstan, and of advancing tape past a head out of engagement with said head in a fast tape advance mode. The invention according to the subject aspect resides, more specifically, in the improvement comprising in combination the steps of, or means for applying said tape to said capstan and to said vacuum columns, advancing with said capstan said applied tape in said information transducing mode through said vacuum columns and with said information recording surface in engagement with said head for an information transducing operation, removing said tape from said first vacuum column and disengaging said tape from said capstan for said fast tape advance mode, while retaining said tape in said second vacuum column, generating a pressure gradient in a direction away from said head, maintaining with said pressure gradient said tape out of engagement with said head while said tape is advanced through said second vacuum column in said fast tape advance mode, and controlling said fast tape advance mode with said second vacuum column.

From another aspect thereof, the subject invention resides in a method of advancing tape relative to an information transducing head with the aid of a tape drive capstan, a first vacuum column at said tape drive capstan and a second vacuum column remote from said capstan. The invention according to the latter aspect resides, more specifically, in the improvement comprising in combination the steps of, or means for, applying said tape to said capstan and to said vacuum columns, advancing said tape with said capstan through said vacuum columns and in information transducing relationship with said head in an information transducing mode, removing said tape from said first vacuum column and disengaging said tape from said capstan for a fast tape advance mode, while retaining said tape in said second vacuum column, advancing said tape in said fast tape advance mode only through said second vacuum column as between said first and second vacuum columns, and controlling said fast tape advance mode with said second vacuum column.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
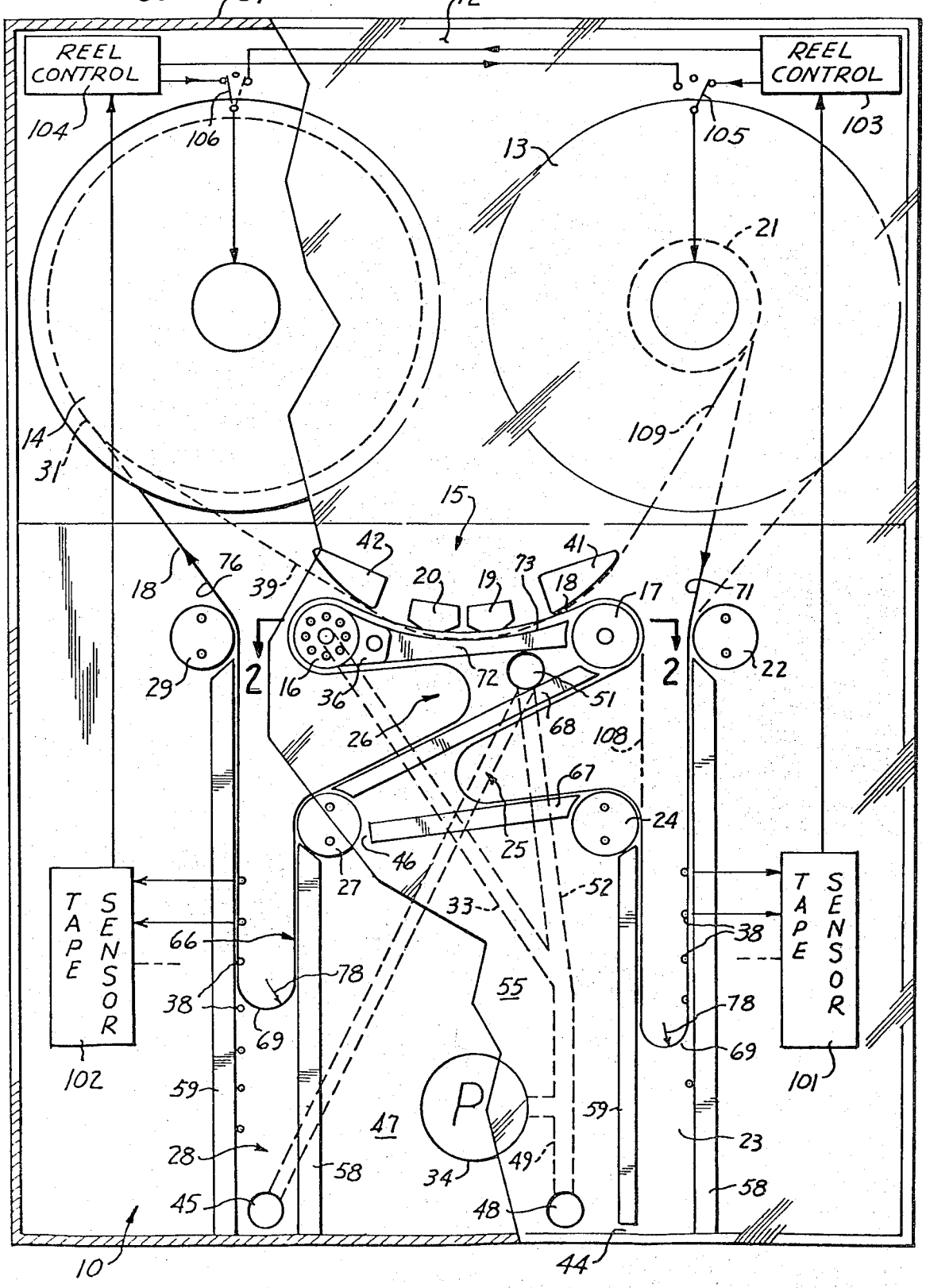
FIG. 1 is an elevation of an instrumentation tape recorder on which the subject invention may be practiced, and illustrates features of the subject invention.

Briefly, the magnetic tape transport 10 shown in FIG. 1 has a baseplate 12 rotatably supporting a tape supply reel 13 and a tape takeup reel 14.

The baseplate 12 preferably is somewhat recessed relative to a baseplate or deck 15 so as to take into account the presence and thickness of the inside sheaves or flanges of the tape reels 13 and 14.

The deck 15 rotatably supports a tape capstan 16 which cooperates with a tape guide 17 in transporting magnetic recording tape 18 past record and reproduce head stacks 19 and 20.

In the operation of the tape transport, magnetic recording tape 18 is advanced from a tape supply roll 21 on the reel 13 along a tape path defined by or traversing a tape guide 22, tape vacuum column 23, tape guide 24, tape loop former 25, guide 17, magnetic head stacks 19 and 20, capstan 16, loop former 26, tape guide 27, tape vacuum column 28 and tape guide 29, to a tape roll 31 on the takeup reel 14.

The tape capstan 16 may be driven by a conventional capstan drive 30 with servo loop control. In accordance with a preferred embodiment, the grooved capstan system disclosed in my U.S. Pat. No. 4,194,661, issued Mar. 25, 1980 to the subject assignee, and herewith incorporated by reference herein, may be employed. As disclosed in the latter patent, the capstan 16 preferably is a vacuum capstan which attracts successive portions of the advancing tape, mainly for the purpose of increased traction along the wrap angle or effective capstan surface. To this end, the capstan preferably is hollow and stands in communication via a conduit 33 with a vacuum pump 34. As also disclosed in the latter patent specification the capstan 16 may have peripheral apertures through which a fluid, such as air, is drawn by the pump 34 in order to attract the tape to an effective arc along the capstan.

As further disclosed in the latter patent, the capstan 16 may have associated therewith a block 36 which shields the tape against detrimental vacuum attraction on its way to and from the capstan 16. To this end, and as disclosed in the latter patent, the capstan 16 and tape guide block 36 may have a series of interdigitated ridges and corresponding grooves, with the ridges and grooves of the capstan extending circumferentially about, and alternating across, the capstan. Moreover, the circumferential capstan ridges ride in corresponding arcuate grooves of the block 36, while arcuate ridges of that block extend into corresponding circumferential grooves of the capstan 16.

Those skilled in the art of instrumentation tape recorders and similar equipment will recognize that the tape transport 10 will in practice be equipped with reel hub assemblies which releasably carry the tape reels 13 and 14 and with reel drives which may be of a conventional type in order appropriately to drive the reels 13 and 14 of the tape transport. Equipment of this type typically employs sensors 38 in the vacuum columns 23 and 28 for sensing the lengths of the tape loops in the columns in order to servocontrol the tape reel drives.

In practice, the tape 18 may run either from the reel 13 to the reel 14 as described above, or then from the reel 14 to the reel 13. For fast tape winding or fast tape reversal, the vacuum line 33 and ports 48 and 51 may be blocked so that the tape may be pulled out of the vacuum columns 23 and 28 and loop formers 25 and 26, in order to extend as indicated by a dotted line 39 directly between the reels 13 and 14 via the head stack area and tape guides 41 and 42.

Preparatory to a recording or playback process, a fluid, such as air, is withdrawn with the vacuum pump 34 from the vacuum columns 23 and 28 and loop former 25 through ports 44, 45 and 46, space 47, port 48 and conduit 49. Air is also withdrawn by the pump 34 from the loop former 26 via a port 51 and conduit 52 and from the capstan 16 via conduit 33.

The tape 18 will thus assume essentially the loop configuration and position shown solidly in FIG. 1.

The loop formers 25 and 26 include wedge-shaped vacuum spaces controlling the extent of the tape loops that can form at 25 and 26. In practice, these tape loops have the advantage of isolating the capstan and tape transport at the head stacks 19 and 20 from the tape reels 13 and 14 and from the inertia of these reels and of the remainder of the tape transport. In particular, the formation of the loops at 25 and 26 enables practically instantaneous start of the hollow low-inertia capstan 16.

The length of the tape loop in each vacuum column 23 and 28 is monitored by sensors 38, as indicated above. By way of example, these sensors may be of an optical type, having photocells 38 illuminated by corresponding light sources located in a side of the vacuum column, to be successively obstructed by the tape as the loop expands in the column. These and other loop sensors are conventional in the art.

In the operation of equipment shown in FIG. 1, it is very important that the individual heads or elements of the reproduce stack operate accurately in the same tracks as their corresponding respective heads or elements in the recording head stacks. These and other reasons of high precision and accuracy require the tape to be accurately positioned and guided along a reference surface. In the illustrated preferred embodiment, and as shown by way of example in FIGS. 2 and 3, such reference surface may be provided by ceramic discs 54 or other tape edge guides. If desired, the tape guide system disclosed in U.S. Pat. No. 4,316,568 by Nancy L. Sarkisian and myself, issued Feb. 23, 1982, and assigned to the subject assignee, may advantageously be employed in the present apparatus.

To prevent loss of vacuum from and contamination of the tape transport, a plate 55 of glass or another suitable material is positioned at a distance from the baseplate 15.

The baseplates 12 and 15 and the front or glass plate 55 are mounted in the frame 57 of the illustrated equipment. To improve performance, one or more of the guides 17, 22, 24, 27, 29, 39, 41 and 42 may be structured and operated as air bearings.

In addition to including parts of the plates 15 and 55, the vacuum columns 23 and 28 are also formed by lateral walls 58 and 59 extending between the plates 15 and 55 in fluid-tight relationship therewith. The pump 34 acts through ports 44, 45 and 48 and vacuum space 47 in drawing a fluid, such as air, into each vacuum column to form a loop of tape 66 therein.

In the loop formers or vacuum columns 25 and 26, the radius of the tape bend diminishes with increasing loop length, as lateral vacuum column delimiters 67 and 68, for example, are convergent.

The magnetic tape recorder or tape transport 10, or a simplified or modified version thereof, is according to a preferred embodiment of the subject invention employed in methods and apparatus for advancing tape 18 having an information recording surface 71 in engagement with information transducing heads 19 and 20 in an information transducing mode, signified in FIG. 1 by a solid line showing the tape 18, and of advancing tape 18 past the heads 19 and 20 out of engagement with such heads in a fast tape advance mode, signified by dotted lines 39. Typical fast tape advance modes are rapid rewind and fast forward, during which the reels 13 and 14 typically are driven at considerably higher speed than during recording and playback operations. By way of example, the tape speed may be some ten times higher in the fast advance mode than in the information transducing mode.

The illustrated magnetic tape transport 10 includes a tape positioner 72 presenting a sliding surface 73 at a distance from the heads 19 and 20. In the information transducing mode, the solidly illustrated tape 18 is advanced at a distance from the sliding surface 73 of the tape positioner 72, with the information recording surface 71 of the tape being advanced in engagement with the heads 19 and 20 for such information transducing operations as recording and playback, with or without erasure.

Figure 2:
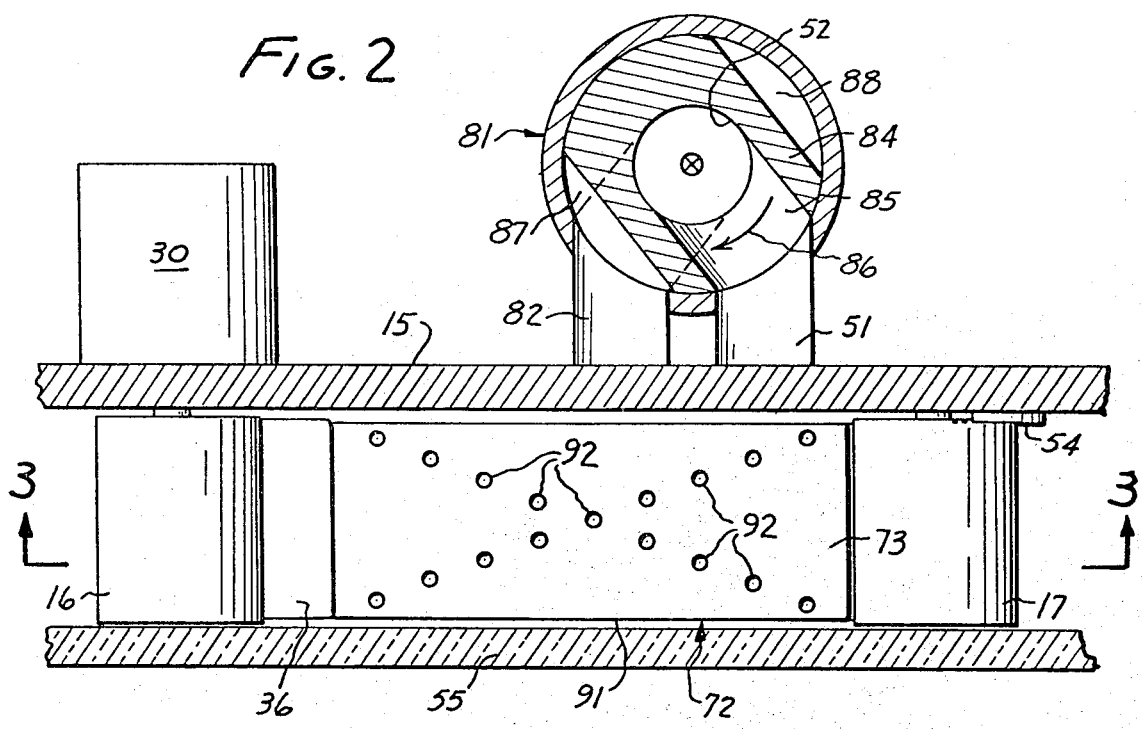
FIG. 2 is a section, on an enlarged scale, taken essentially along the line 2—2 of FIG. 1.

In a fast tape advance mode, the tape 18 is moved to the sliding surface 73 away from the heads 19 and 20 and is advanced along that sliding surface in spaced relationship to the heads, as indicated by dotted lines 39 in FIGS. 1 and 2.

Figure 3:
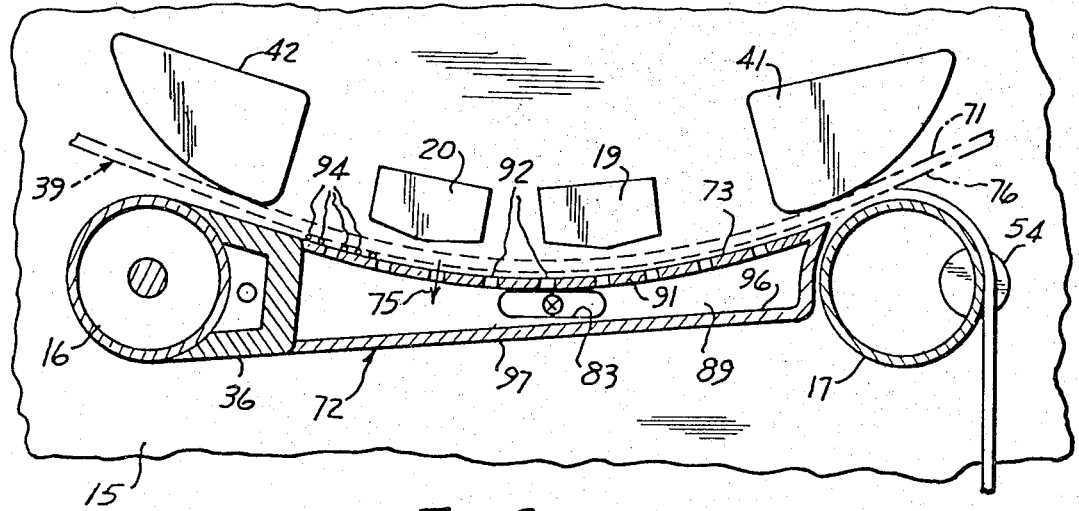
FIG. 3 is a section taken along the line 3—3 of FIG. 2.

As also seen in FIGS. 1 and 3, the sliding surface 73 preferably is oriented to parallel partially a path of advancement of the tape 18 when in engagement with the heads 19 and 20. In other words, the sliding surface 73 at least partially parallels the path along which the solidly illustrated tape 18 advanced in the information transducing mode. In this manner, the tape is most conveniently and reliably switched between its information transducing and fast advance paths.

The illustrated tape transport 10 generates one or more pressure gradients 75 on a surface 76 of the tape 18 opposite its recording surface 71. As illustrated in FIG. 3, such pressure gradient 75 acts in a direction away from the heads 19 and 20.

The pressure gradient 75 maintains the tape 18 out of engagement with the heads 19 and 20 while the tape is advanced in the fast tape advance mode.

For example, the tape 18 is selectively pulled with the pressure gradient 75 out of engagement with the heads 19 and 20 for a fast tape advance mode.

The reel 13 or 14 and its drive may serve as means connected to the tape 18 for advancing such tape past the heads 19 and 20 in the fast tape advance mode while the pressure gradient 75 maintains the tape out of engagement with such heads, as seen at dotted lines 39 in FIGS. 1 and 3.

In principle, the tape 18 in the fast advance mode could be blown away from the heads 19 and 20 by jets or streams of air or another gas. However, according to the best mode currently contemplated for carrying the subject invention into effect, the pressure gradient 75 is generated by an evacuation process acting on the mentioned opposite surface 76 of the tape 18. To this end, an individual vacuum pump may be employed for the tape positioner 72, or the same vacuum or vacuum pump 34 may be utilized for the different vacuum columns 23, 25, 26 and 28, for the vacuum capstan 16 and for the tape positioner 72. In that case, the vacuum may be vented to the tape positioner 72 for the fast tape advance mode.

FIG. 2 shows a valve 81 partially in section, for switching the vacuum pump line 52 alternatively to the vacuum column or loop former port 51 and to a vacuum line 82 and port 83 of the tape positioner 72. The valve 81 houses a angularly movable core 84 which has an axial central bore connected to the vacuum line 52 and which, in the solidly illustrated position, connects the vacuum pump 34 to the vacuum port 51 via a radial bore 85. As indicated in FIG. 2 by the arrow 86, the valve core 84 may be turned so as to disconnect vacuum port 51 and to connect the tape positioner vacuum line 82 and port 83 to the vacuum line 52 and pump 34. If desired or necessary, the valve 81 may have conventional vents 87 and 88 for venting to atmosphere the inside 89 of the tape positioner in the solidly illustrated position of the valve, and for venting to atmosphere the vacuum column or loop former 26 in the position of the valve connecting the tape positioner 72 to the vacuum pump 34.

Switching of the valve 81 in the direction of the arrow 86 thus generates a pressure gradient 75 at a surface 76 of the tape opposite the information recording surface 71. The tape 18 may thus be pulled with that pressure gradient 75 selectively out of engagement with the heads 19 and 20. The tape 18 may thus be moved or pulled to the sliding surface 72 away from the heads 19 and 20, and maintained at that sliding surface with the aid of an evacuation process or pressure gradient 75 acting on the mentioned opposite tape surface 76 during the rapid tape mode, or during advancement of the tape 18 along the sliding surface 73 in spaced relationship to the heads 19 and 20.

The sliding surface 73 may be the top surface of an apertured plate 91 of a durable metal or other suitable material. The plate 91 has apertures 92 through which air is drawn by the partial vacuum in the hollow space 92 for the formation of pressure gradients 75 attracting the tape 18 to the sliding surface 73.

As seen in FIG. 2, the apertures 92 may extend at an angle to the direction of tape advance, such as in the form of a Union Jack or X-shaped pattern, in order to minimize and equalize any effect of the presence of the apertures 92 on the running tape 18.

The sliding surface 73 may present the tape with a friction that is reduced relative to the friction the material of the plate 91 itself would provide if directly exposed to the tape. By way of example, the plate 91 may be covered with a friction reducing or low-friction coating at 73. Also by way of example, spherical glass beads or elements of the type used for reflective traffic signs may be provided on the top surface of the vacuum platen 91. Such glass beads may be embedded in a waterproof binder and adhered to a waterproof, flexible plastic backing, as in a "Scotch Lite" reflective traffic sign surface. The tape 18 thus rides on glass beads, partially shown at 94, when sliding along the vacuum platen 91.

According to another embodiment of the invention, the tape rides on the plate 91 directly, which for this purpose preferably has a smooth surface for preventing loss of vacuum.

The sliding surface 73 or platen 91 extends laterally between and in close proximity to the back wall or base plate 15 and the front wall or glass cover plate 55 to permit the vacuum force gradients 75 to develop upon partial evacuation of the space 89 and to take hold on and attract the tape 18 away from the heads 19 and 20 and onto the sliding surface 73.

When the tape 18 has thus been drawn into position against the device 72 or sliding surface 73, then the vacuum acts only on the surface portions of the tape exposed through the holes 92, which, relative to the total area of the sliding surface 73, present a greatly reduced total aperture area. Hence, the tape 18 moves very easily along the sliding surface 73, but the substantial force of the vacuum or gradient 75 acting on the tape surface is still available to draw the tape away from the heads 19 and 20 and to maintain such tape on the sliding surface 73 during the fast advance mode.

Friction on the sliding surface 73 may also be reduced by imposing a certain tension on the advancing tape 18. In practice, the fast forward or rewind tension acting to lift the tape away from the sliding surface 73 and the step change in the pull from the vacuum or pressure gradient as it contacts the surface will result in the tape marginally contacting the positioning device or sliding surface 73.

The sliding surface 73 or vacuum platen 91 is of an arcuate configuration. In this respect, it may be recalled that the tape transport 10 provides a vacuum column 23, 25, 26 or 28 for forming a varying loop 69 of the tape 18 during advance of such tape in the information transducing mode.

The sliding surface 73 has a radius larger than an average radius 78 of the varying loop 69. In the case of vacuum columns 23 and 28, the tape loop radius 78 remains fairly constant. On the other hand, the radius of the tape loop in the vacuum columns or loop formers 25 and 26 varies in their operation. For the purpose of comparison with the larger radius of the sliding surface 73, the tape loop radii at 23, 25, 26 and 28 are summarized by the term "average radius."

For a given pressure differential across the tape 18, tension is directly proportional to the radius of the sliding surface 73, whereby the tape is effectively and efficiently retained against such surface in the fast advance mode.

The plate 91 may be fitted in the top of a container or pan 96, the bottom 97 of which may form one of the delimiting sides of the loop former 26, if desired.

In the fast tape advance mode, the positioning device 72 maintains the tape 39 away from the heads 19 and 20, thereby preventing undue head wear and deterioration of the tape. Retention of the tape at the sliding surface 73 by an evacuation process is preferable to the use of air or gas jets or streams for pushing the tape away from the heads. For one thing, the vacuum acts on the rear surface 76 of the tape, while air or gas streams and contaminants contained therein would affect directly the delicate information recording surface 71.

Moreover, air or gas jets tend to subject the tape to flutter effects and to introduce humidity and dust into the system.

At the end of a fast tape advance operation, and preparatory to information transducing, generation of the pressure gradient 75 or the evacuation process is terminated, such as by actuation of the valve 81 against the direction of the arrow 86. The tape 18 is thus reapplied to the heads 19 and 20, and is advanced with the information recording surface 71 in engagement with the heads 19 and 20 after termination of the pressure gradient or evacuation process. In the case of the illustrated embodiment of the invention, the tape after reapplication to the heads 19 and 20 is advanced out of engagement with the sliding surface 73 but with the information recording surface 71 in engagement with the heads 19 and 20 after termination of the pressure gradient 75 or of the evacuation process. Again, the vacuum valve 81 may constitute or form part of means for terminating generation of the pressure gradient 75 or evacuation at 89, and for reapplying the tape 18 to the heads 19 and 20.

In this respect, the valve 81 as seen in FIG. 2 has only been described so far in terms of switching vacuum ports 51 and 83. In practice, however, the vacuum line 33 leading to the tape advance capstan 16 and the vacuum port 45 would also be switched upon actuation of the valve core 84. For instance, the capstan vacuum line 33 and both ports 45 and 51 would be disconnected from the vacuum pump 34 as the space 89 inside the tape positioning device 72 is being evacuated through port 83 and via valve 81. At the same time, the vacuum line 33 or capstan 16 and the ports 45 and 51 would be vented to atmosphere.

In that case, rotation of either reel 13 or 14 would easily pull the tape loops at least out of vacuum column 28 and loop former 26, as indicated by the dotted line 39 in FIG. 1 and as more fully described below.

On the other hand, if generation of the pressure gradient 75 or the evacuation in the tape positioner 72 is terminated by actuation of the valve 81, the capstan vacuum line 33 and ports 45 and 51 are reactivated for an attraction of the tape 18 onto the capstan 16, and a formation of tape loops in the vacuum columns and loop formers. The tape 18 is thus applied to the capstan 16 and to the tape guide 17, and the capstan 16 rotated by its drive 13, advances the applied tape in the information transducing mode, with the recording surface 71 moving in engagement with the information transducing heads 19 and 20.

The pressure gradient 75 may then be generated as described above on a surface 76 of the tape opposite the recording surface 71 in a direction away from the head, and the tape 18 may be disengaged from the capstan for the fast tape advance mode. To this end, the evacuation process may be switched from the vacuum capstan 16 and vacuum columns 26 and 28 to the tape positioner 72, as described above. The tape is thereby maintained with the pressure gradient 75 out of engagement with the heads 19 and 20 and is also maintained out of engagement with the capstan 16 and tape guide 17 while the tape is advanced in the fast tape advance mode. The tape is thus advanced along the sliding surface 73 in spaced relationship to the heads 19 and 20 and to the capstan 16, and preferably also in spaced relationship to the tape guides 17, etc.

According to a preferred embodiment of the invention, only vacuum columns 26 and 28 are deactivated and the tape 18 is still pulled through vacuum columns 23 and 25, or at least through vacuum column 23, which then controls the fast tape advance mode.

In particular, the currently discussed aspect of the invention resides in methods and apparatus for advancing tape 18 having an information recording surface 71 in an information transducing mode with the aid of a tape drive capstan 16, a first vacuum column 28 at the tape drive capstan and a second vacuum column 23 remote from the capstan, and for advancing tape past heads 19 and 20 out of engagement with such heads in a fast tape advance mode. The invention according to this aspect resides more specifically in the improvement comprising in combination the steps of, or means for, applying the tape 18 to the capstan 16 and to said vacuum columns 23 and 28, advancing with the capstan 16 the applied tape 18 in the information transducing mode through the vacuum columns 23 and 28 and with the information recording surface 71 in engagement with heads 19 and 20 for an information transducing operation. Thereafter, the tape 18 is removed from the first vacuum column 28 and is disengaged from the capstan 18 for said fast tape advance mode indicated by dotted line 39, while the tape is retained in the second vacuum column 23 according to the currently discussed preferred embodiment. The pressure gradient 75 is then generated on a surface 76 of the tape 18 opposite its recording surface 71, in a direction away from heads 19 and 20, and the tape 18 is maintained with the pressure gradient 75 out of engagement with the heads 19 and 20 while the tape is advanced through the second vacuum column 23 in the fast tape advance mode. Further according to the illustrated preferred embodiment, the fast tape advance mode is then controlled with the second vacuum column 23, as more fully described below.

According to a preferred embodiment employing the sliding surface 73 at a distance from heads 19 and 20, the tape 18 is applied to the capstan 16 and to the vacuum columns 23 and 28. The tape is then advanced with the capstan 16 through vacuum columns 23 and 28 and at a distance from sliding surface 73, with the information recording surface 71 in engagement with the heads 19 and 20 in an information transducing mode. Thereafter, the tape 18 is removed from the first vacuum column 28 and is disengaged from the capstan 16 for a fast tape advance mode, while being retained in the second vacuum column 23. The tape is thereupon moved to the sliding surface 73 away from heads 19 and 20, and is advanced through the second vacuum column 28 and along the sliding surface 73 in spaced relationship to heads 19 and 20 in the fast tape advance mode, which is again controlled with the second vacuum column 23.

Parts of these preferred embodiments are of independent significance. In particular, according to a further aspect thereof, the invention resides broadly in methods and apparatus for advancing tape relative to information transducing heads 19 and 20 with the aid of a tape drive capstan 16, a first vacuum column 28 at the tape drive capstan 16 and a second vacuum column 23 remote from the capstan. The invention according to this aspect resides, more specifically, in the improvement comprising in combination the steps of or means for applying the tape 18 to the capstan 16 and to the vacuum columns 23 and 28, advancing the tape with the capstan 16 through said vacuum columns 23 and 28 and in information transducing relationship with heads 19 and 20 in an information transducing mode. The methods and apparatus under consideration further remove the tape 18 from the first vacuum column 28 and disengage the tape 18 from the capstan 16 for a fast tape advance mode, while retaining the tape in the second vacuum column 23, and advance the tape in the fast tape advance mode only through the second vacuum column 23 as between the first and second vacuum columns 23 and 28. The fast tape advance mode is then controlled with the second vacuum column 23.

According to a preferred embodiment, tape tension preferably is increased during the fast tape advance mode by increasing the vacuum in the second vacuum column 23. This in practice makes for a tighter tape pack on the tape reel, and may be effected by closing port 45 with the valve 81.

As before, first and second variable loops 25 and 26 may be formed in the tape adjacent the first and second vacuum columns 23 and 28, respectively. By closing port 51 the first loop is straightened when removing the tape from the first vacuum column 28, while retaining the second loop 23. The tape is then advanced in the fast tape advance mode only through the second vacuum column 23 and second loop 25 as between the first and second vacuum columns and first and second loops 23, 25, 26 and 28.

In the illustrated preferred embodiment, the fast tape advance mode includes winding the tape from one tape reel 13 onto another tape reel 14 and the mentioned control includes the step of controlling in the fast tape advance mode with the second vacuum column 23 the tape reel 13 or 14 having more tape wound thereon as between the one and the other tape reels 13 and 14.

To this end, tape sensors or loop sensors 101 and 102 receive signals from the photocells 38 for, in turn, controlling reel drive controls 103 and 104, respectively.

These reel controls 103 and 104 individually act via three-way switches 105 and 106 on the reel drives for reels 13 and 14.

In the solidly illustrated position of the switches 105 and 106, each vacuum column 23 or 28, tape loop length sensor 101 or 102 and reel control 103 or 104 controls its corresponding reel 13 and 14 for tape winding and unwinding operations in the information transducing mode.

On the other hand, for the fast tape advance mode, such as fast forward or rapid rewind, either switch 105 or 106 may be placed in its central position for disconnection of the particular reel drive from its control 103 or 104. In that case, the second vacuum column 23, tape sensor 101 and reel control 103 is then employed to control a selected reel 13 and 14; preferably the reel which has most of the tape wound thereon at the particular time.

For instance, if the switch 105 is in the solidly illustrated position, while the switch 106 is in its central inactive position, then the vacuum column 23 controls the reel 13. On the other hand, if the switch 106 is in its dotted position, while the switch 105 is in its central inactive position, then the vacuum column 23 controls the reel 14.

In either case, the result is a controlled fast tape advance mode as distinguished from an uncontrolled situation. This is a very significant feature, manifesting itself in such advantages as a tighter tape pack, improved winding operation and more reliable functioning of the tape positioner 72.

If desired, speed sensors may conventionally be employed to determine the amount of tape on each reel, and the switches may advantageously be actuated so that the control switches from one reel to another as the tape coil increases on the latter.

If desired, the loop former 25 may also be blocked in the fast tape advance mode, whereby the tape travels directly into and out of the vacuum column 23, as indicated by the chain dotted line 108.

If no rewind or fast forward control is desired, the tape may be led straightly to and from the reel 13, as indicated by phantom line 109. A control through vacuum column 23 is, however, preferred with the type of machine shown in FIG. 1.

The subject invention thus meets all of its above mentioned objectives and presents advanced methods and apparatus for transporting tape in multimode machines.

The subject extensive disclosure suggests or renders apparent to those skilled in the art various modifications and variations within the spirit and scope of the invention.

I claim:

1. In a method of advancing tape having an information recording surface in an information transducing mode with the aid of a tape drive capstan, a first vacuum column at said tape drive capstan and a second vacuum column remote from said capstan, and of advancing tape past a head out of engagement with said head in a fast tape advance mode, the improvement comprising in combination the steps of:

applying said tape to said capstan and to said vacuum columns;

advancing with said capstan said applied tape in said information transducing mode through said vacuum columns and with said information recording surface in engagement with said head for an information tranducing operation;

removing said tape from said first vacuum column and disengaging said tape from said capstan for said fast tape advance mode, while retaining said tape in said second vacuum column;

generating a pressure gradient in a direction away from said head;

maintaining with said pressure gradient said tape out of engagement with said head while said tape is advanced through said second vacuum column in said fast tape advance mode; and controlling said fast tape advance mode with said second vacuum column.

2. In a method of advancing tape relative to an information transducing head with the aid of a tape drive capstan, a first vacuum column at said tape drive capstan and a second vacuum column remote from said capstan, the improvement comprising in combination the steps of:

applying said tape to said capstan and to said vacuum columns;

advancing said tape with said capstan through said vacuum columns and in information transducing relationship with said head in an information transducing mode;

removing said tape from said first vacuum column and disengaging said tape from said capstan for a fast tape advance mode, while retaining said tape in said second vacuum column;

advancing said tape in said fast tape advance mode only through said second vacuum column as between said first and second vacuum columns; and controlling said fast tape advance mode with said second vacuum column.

3. A method as claimed in claim 2, including the step of:

increasing tape tension during the fast tape advance mode by increasing a vacuum in said second vacuum column.

4. A method as claimed in claim 2, including the step of:

forming first and second variable loops in said tape adjacent said first and second vacuum columns, respectively;

straightening said first loop when removing said tape from said first vacuum column, while retaining said second loop; and advancing said tape in said fast tape advance mode only through said second vacuum column and second loop as between said first and second vacuum columns and first and second loops.

5. A method as claimed in claim 2, 3 or 4, wherein:
said fast tape advance mode includes winding said tape from one tape reel onto another tape reel; and
said controlling includes controlling in said fast tape advance mode with said second vacuum column the tape reel having more tape wound thereon as between said one and said other tape reels.

6. A method as claimed in 2, 3 or 4, wherein:
said tape is advanced in engagement with said head during said information transducing mode; and
said tape is disengaged from said head for and during said fast tape advance mode.

7. In apparatus for advancing tape having an information recording surface in an information transducing mode with the aid of a tape drive capstan, a first vacuum column at said tape drive capstan and a second vacuum column remote from said capstan, and for advancing tape past said head out of engagement with said head in a fast tape advance mode, the improvement comprising in combination:
means for applying said tape to said capstan and to said vacuum columns;
means for advancing with said capstan said applied tape in said information transducing mode through said vacuum columns and with said information recording surface in engagement with an information transducing head;
means for selectively removing said tape from said first vacuum column and disengaging said tape from said capstan for said fast tape advance mode, while retaining said tape in said second vacuum column;
means for generating a pressure gradient on a surface of said tape in a direction away from said head;
means connected to said generating means for maintaining with said pressure gradient said tape out of engagement with said head while said tape is advanced through said second vacuum column in said fast tape advance mode; and
means coupled to said second vacuum column for controlling said fast tape advance mode with said second vacuum column.

8. In apparatus for advancing tape relative to an information transducing head with the aid of a tape drive capstan, a first vacuum column at said tape drive capstan and a second vacuum column remote from said capstan, the improvement comprising in combination:
means for applying said tape to said capstan and to said vacuum columns;
means for advancing said tape with said capstan through said vacuum columns and in information transducing relationship with said head in an information transducing mode;
means for selectively removing said tape from said first vacuum column and disengaging said tape from said capstan for a fast tape advance mode, while retaining said tape in said second vacuum column;
means coupled to said tape for advancing said tape in said fast tape advance mode only through said second vacuum column as between said first and second vacuum columns;
means coupled to said second vacuum column for controlling said fast tape advance mode with said second vacuum column.

9. Apparatus as claimed in claim 8, including:
means coupled to said second vacuum column for increasing tape tension during the fast tape advance mode by increasing a vacuum in said second vacuum column.

10. Apparatus as claimed in claim 8, including:
means for forming first and second variable loops in said tape adjacent said first and second vacuum columns, respectively; and
means for straightening said first loop when removing said tape from said first vacuum column, while retaining said second loop;
said means for advancing said tape in said fast tape advance mode including means for advancing said tape in said fast tape advance mode only through said second vacuum column and second loop as between said first and second vacuum columns and first and second loops.

11. Apparatus as claimed in claim 8, 9 or 10, including:
means for winding said tape from one tape reel onto another tape reel;
said controlling means including means for controlling in said fast tape advance mode with said second vacuum column the tape reel having more tape wound thereon as between said one and said other tape reels.

12. Apparatus as claimed in claim 8, 9 or 10, wherein:
said means for advancing said tape in said information transducing mode include means for advancing said tape in engagement with said head during said information transducing mode; and
said means for advancing said tape in said fast tape advance mode include means for disengaging said tape from said head for and during said fast tape advance mode.

* * * * *